United States Patent [19]

Garbar et al.

[11] Patent Number: 4,702,608
[45] Date of Patent: Oct. 27, 1987

[54] DEVICE FOR MAKING CREAM

[76] Inventors: Henry J. Garbar; Joan H. Garbar, both of 95 Winding Rd., Madison, Conn. 06443

[21] Appl. No.: 939,735

[22] Filed: Dec. 9, 1986

[51] Int. Cl.[4] .......................... B01F 15/06; B01F 7/24
[52] U.S. Cl. .................... 366/146; 366/149; 366/192; 366/196; 366/251; 425/378 R
[58] Field of Search ............... 366/145, 146, 149, 154, 366/156, 155, 184, 192, 193, 194, 195, 196, 249, 251, 252, 279, 604, 279; 425/376, 378, 466

[56] References Cited

U.S. PATENT DOCUMENTS

| | | | |
|---|---|---|---|
| 1,094,082 | 4/1914 | McCaddon | 366/165 |
| 1,963,549 | 6/1934 | Ferns | 366/267 |
| 2,195,234 | 3/1940 | Brown | 366/251 |
| 3,545,938 | 12/1970 | Perry | 366/196 |
| 4,168,942 | 9/1979 | Firth | 425/378 R |
| 4,548,508 | 10/1985 | Verkler | 366/195 |

Primary Examiner—Robert W. Jenkins
Attorney, Agent, or Firm—William W. Jones

[57] ABSTRACT

The device utilizes a helical screw for making cream from a precursor mixture of milk and butter. The screw has a first portion which continuously agitates the milk and butter mixture to prevent it from separating into its milk and butter constituents. The agitating portion also operates to feed the mixture toward the second portion of the screw which is a compression portion. The compression portion of the screw compresses and emulsifies the mixture to convert the milk and butter mixture into cream by forcing the mixture through one or more restricted orifices. The mixture is heated during agitation and compression to temperatures in the range of about 105° F. to about 115° F.

7 Claims, 6 Drawing Figures

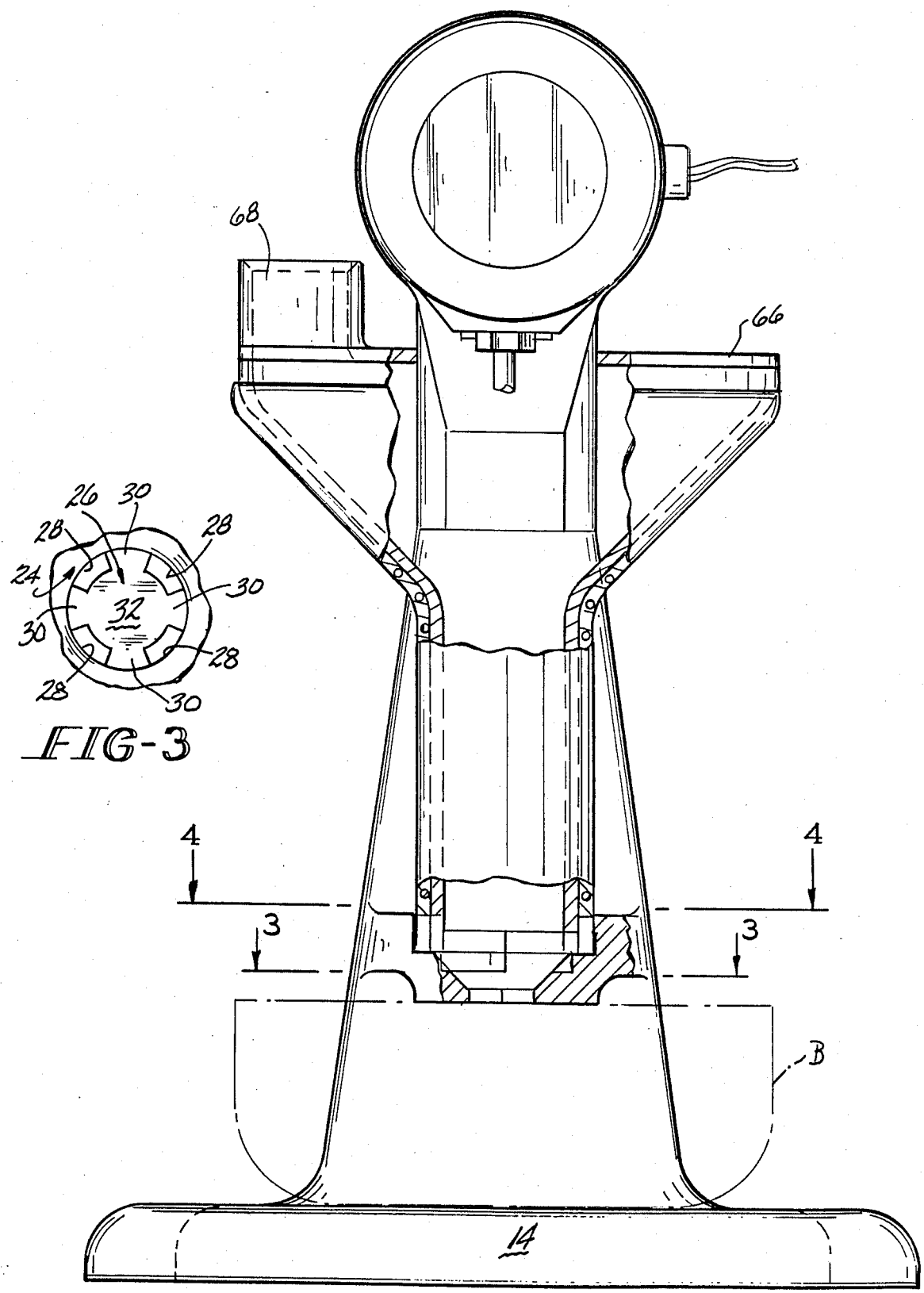

DEVICE FOR MAKING CREAM

This invention relates to a device for making cream. More particularly, the device of this invention includes a large reservoir for holding a butter (or margarine) and milk precursor mixture, a compound screw feeder for agitating and continuously compressing the precursor mixture while extruding it through one or more restricted orifices to form the cream.

Devices which may be used by a homemaker to make fresh cream from a mixture of milk and butter or oleomargarine are known in the prior art. The prior art devices include both hand operated and motor operated versions. Generally speaking, these devices operate on the common principle that if one compresses the mixture of milk and butter through a restricted orifice, the milk and butter will emulsify to form cream. The thickness of the cream can be varied by varying the pressure applied to the initial mixture by using different sized orifices or by otherwise varying the compressive force applied to the mixture. U.S. Pat. Nos. 1,087,599 McCaddon, issued Feb. 17, 1914; 1,094,082 McCaddon, issued Apr. 21, 1914; and 1,963,549 Ferns, issued June 19, 1934 are illustrative of prior patent disclosures of such cream making devices. One home cream maker which is commercially available is sold under the trademark "BEL" by Finesse Limited, Carmel Valley, Calif. The BEL cream maker is hand operated and uses a reciprocating piston operated by a hand lever to compress and extrude the cream from a milk and butter mixture. Another commercially available cream maker sold by THORN EMI, Havant, Hampshire, England, is run by an electric motor and includes a reciprocating piston operating in a compression cylinder, and also includes a small reservoir for holding the milk and butter mixture and feeding it into the compression cylinder. The device also includes a stirrer operated by the motor which serves to continuously agitate the milk/butter mixture to keep it from separating. The devices which are described in the prior art and which are commercially available do not have a large enough capacity, thus they must be constantly attended. Furthermore, they do not produce the cream at a reasonably fast rate or with a reasonably high volume.

The device of this invention is designed for use by the homemaker, and can continuously produce cream from a milk/butter precursor mixture without undue supervision and at a relatively fast rate. The device of this invention uses a screw feed to compress and extrude the milk/butter emulsion, i.e. fresh cream, into a container. The device has a large milk/butter reservoir into which one can pour up to a quart of the milk/butter precursor. The screw feed is operated by an electric motor and is of compound construction. A portion of the screw serves to stir and remix the precursor in the reservoir and draws the precursor down into the compression portion of the screw where the mixture is compressed and forced through the orifice or orifices on the device. Preferably, the mixture is heated during the stirring and compressing steps. The device may utilize interchangeable orifice plates, but preferably includes an adjustable orifice. The reservoir in which the screw fits is preferably removable from the remainder of the device. The reservoir will include an initial enlarged portion, and a subsequent more restricted cylindrical compression portion in which the actual compression emulsification of the mixture occurs. The device may also employ a variable speed motor to change the nature of the cream being made.

It is therefore an object of this invention to provide a home cream making device which will continuously produce cream from a precursor mixture of milk and melted butter or oleomargarine.

It is an additional object of this invention to provide a cream making device of the character described which operates with a helical screw element which stirs, feeds and compressively emulsifies the milk/butter precursor.

It is another object of this invention to provide a cream making device of the character described wherein the helical screw has a stirring and feeding initial portion and a subsequent compression portion.

These and other objects and advantages of this invention will become more readily apparent from the following detailed description of a preferred embodiment of the invention when considered in conjunction with the accompanying drawings, in which:

FIG. 2 is a front elevational view partially broken away of the device of FIG. 1;

FIG. 3 is a fragmented plan view of one of the mating components of the variable area cream extruding nozzle, taken along 3—3 of FIG. 2

Figures 1, 5, 6:
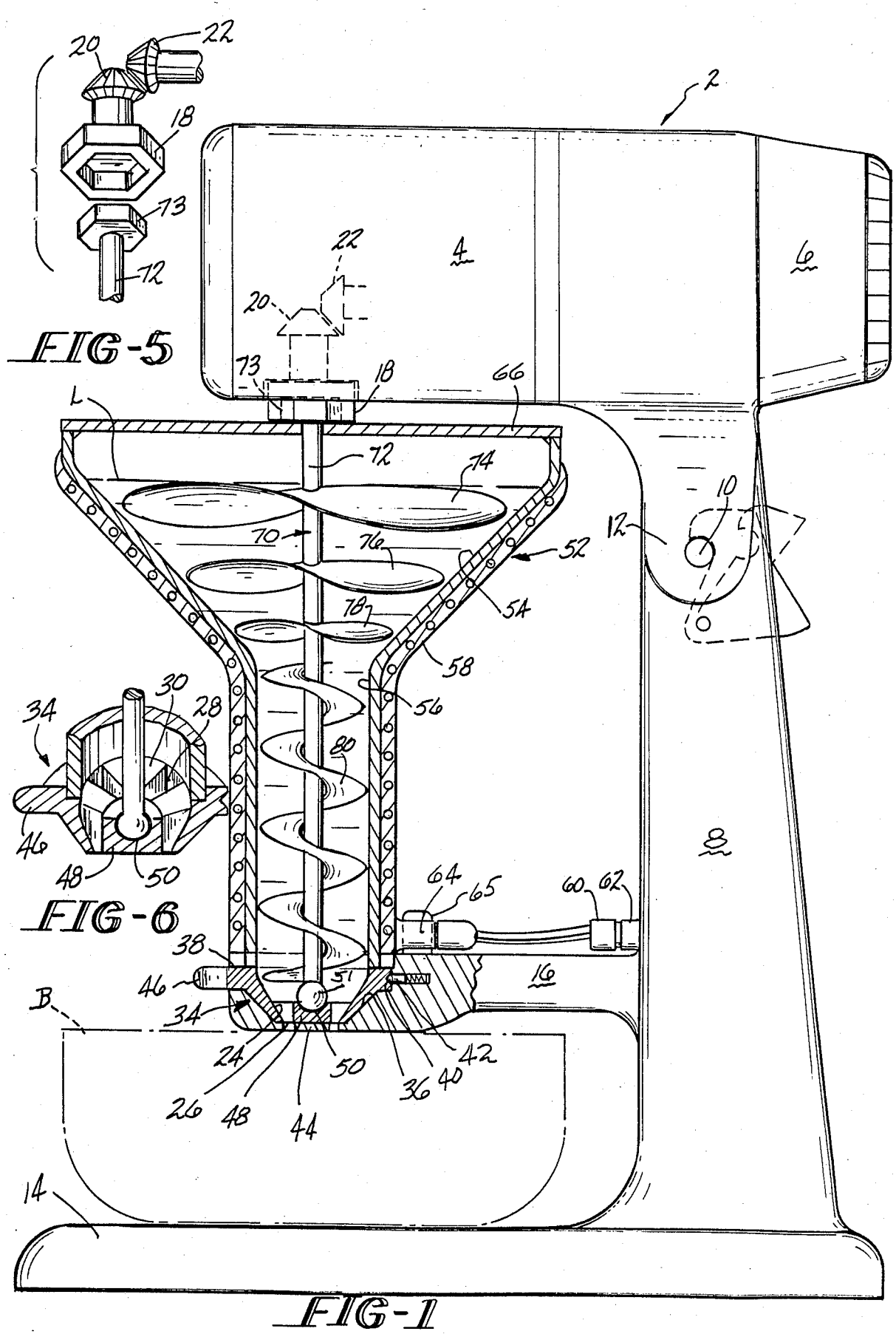
FIG. 1 is a side elevational view partially in cross section of a preferred embodiment of a cream making device formed in accordance with this invention.
FIG. 5 is a fragmented exploded perspective view of the gear drive for the device of FIG. 1.
FIG. 6 is a fragmented perspective view of the cream extrusion nozzle portion of the device.
Figure 4:
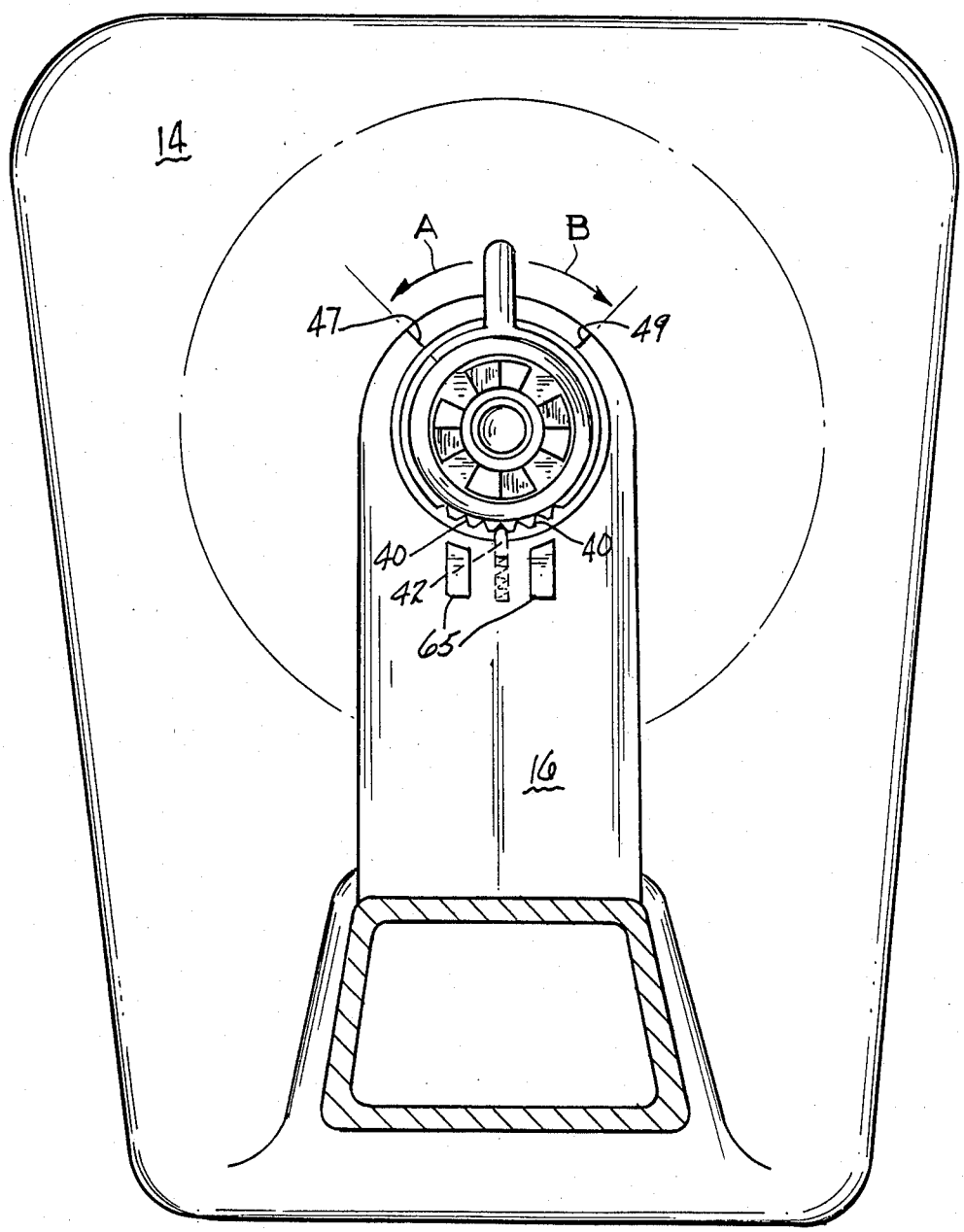
FIG. 4 is a sectional view taken along line 4—4 of FIG. 2.

Referring now to the drawings, there is shown in FIG. 1 a preferred embodiment of a device denoted generally by the numeral 2 for use by a homemaker for making cream from a milk/butter precursor. The device 2 includes a motor housing 4 in which an electric motor is disposed. A dial 6 is mounted on the housing 4 for varying the speed of the motor. The motor housing 4 is pivotally mounted on a stand 8 by a pin 10 extending through the stand 8 and a clevis portion 12 on the housing 4. The stand also includes a foot 14 and a support shelf 16 upwardly offset from the foot 14. Extending downwardly from the housing 4 is a drive socket 18 which is rotatably driven by the motor via bevel gears 20 and 22 (shown in phantom). At the outer end of the support shelf is a tapered well 24 having a flat bottom 26 with an interrupted extrusion orifice shown in FIG. 3. The extrusion orifice portions include circumferentially spaced openings 28 which intervening lands 30. In the center of the flat bottom 26 is a seat wall 32. Disposed in the well 24 is rotatable shutter 34 which has a tapered outer wall 36 matching the taper of the well 24. The shutter 34 also has an upper cylindrical outer side wall 38 formed with a series of notches 40 which are engaged by a spring-biased detent 42 mounted on the support shelf 16. The bottom wall 44 of the shutter 34 seats on the bottom wall 26 of the well 24 and is provided with an interrupted extrusion orifice configured like that shown in FIG. 3 formed in the support shelf well 24, but circumferentially offset therefrom. The shutter 34 includes an adjustment handle 46 which is grasped manually to pivot the shutter 34 in the well 24. The openings 38 and lands 30 can each occupy successive 45° arcs in the bottom wall 26 with the openings and lands of the shutter 34 being positioned with respect to the openings and lands in the well 24 so that positioning of the handle 46 as shown in FIG. 4 will result in 50% of the openings 28 being aligned so that a medium thickness cream will be obtained. By moving the handle in the direction of the arrow A the percent of the aligned openings 28 will decrease and thicker cream will result. Alternatively, moving the handle in the direction of the arrow B will result in a thinner cream since the size of the composite extrusion orifice will increase. The shelf support 16 is formed with stops 47 and 49 to limit rotation of the shutter 34. In the center of the inside of the shutter 34 is a pedistal 48 having an upper centrally disposed concave seat 50 therein.

The device 2 also includes a reservoir 52 for holding the milk/butter precursor. The reservoir 52 includes an upper frusto conical portion 54 and a lower cylindrical portion 56. The cylindrical portion 56 opens into the shutter/well variable orifice mechanism. A heating sheath or jacket 58 may overlie the reservoir 52 for heating the mixture to a temperature in the range of about 105° F. to about 115° F. during the cream making operation. The jacket 58 may be a unitary part of the reservoir 52 or may be a sparate component selectively mountable on the reservoir 52. The jacket 58 can be operated by an extension cord 60 which connects electrical outlets 62 and 64. The outlet 64 is formed as an integral protrusion on the reservoir 52. The reservoir 52 may have a cover 66 which is removable, and which includes a fill spout 68. Inside of the reservoir 52 there is disposed a stir/compression helical screw 70. The screw 70 includes a shaft 72 and a plurality of stirring blades 74, 76 and 78. The stirring blades 74, 76 and 78 are of diminishing diameter as they progress down into the frusto conical portion 54 of the reservoir 52. The purpose of the stirring blades, 74, 76 and 78 is to ensure that the milk/butter precursor does not separate into its components, as the butter will continuously and immediately tend to rise to the top of the mixture. To counter this tendency, the blades 74, 76 and 78 are operable to continuously propel the mixture downwardly in the reservoir 52. This results in remixing of any butter fraction which otherwise will tend to separate to the top. It will be noted that the suggestive maximum fill level L of the liquid precursor mixture will be such that the uppermost blade 74 will project to a limited extent above the fill level L. In the cylindrical portion 56 of the reservoir there is a helical compression screw 80 which receives the milk/butter mixture from the frusto conical portion 54 of the reservoir 52, and compresses it in the cylindrical portion 56 of the reservoir 52. The milk/butter mixture is drawn downwardly and compressed against the lower end of the reservoir 52 by the compression screw 80. As a result of the compression and heat imparted to the milk/butter mixture, the latter is emulsified in the cylindrical portion 56 of the reservoir 52 and extrudes through the openings 28 as cream into a bowl B (shown in phantom.) As previously noted, the smaller the resultant extrusion orifices, the thicker the cream will be. As will be noted in FIG. 5, the upper end of the shaft 72 has a drive nut 73 which fits in the socket 18. As seen in FIGS. 1 and 4, there is a stop fit between the reservoir 52 and the shelf 16, caused by the ears 65 on the shelf 16 which flank the protrusion 64 on the reservoir 52 to prevent the reservoir from rotating on the shelf 16 under the influence of the screw 70. The screw 70 is provided with a ball joint 51 which rotatably seats in the pedestal concavity 50.

It will be readily apppreciated that the device of this invention will continuously and quickly make cream from a prescursor mixture of milk and butter or margarine. The consistency of the cream being made can be easily selected by proper use of the variable extrusion orifice and also of the variable speed motor. The device has a large volume precursor reservoir and also provides constant stirring of the precursor to prevent separation of the milk and butter. Thus, the device does not require undue attention once it is started. The stirring and emulsion of the precursor is accomplished by a compound helical screw and a complementary precursor reservoir. The device is easy and reliable to use by one, such as a homemaker, who has no expertise in the field, and can be easily dismantled for cleaning and storage.

Since many changes and variations of the disclosed embodiment of the invention may be made without departing from the inventive concept, it is not intended to limit the invention other as required by the appended claims.

What is claimed is:

1. An appliance for continuously making cream from a precursor mixture of milk and melted butter or oleomargarine, said appliance comprising:
   (a) a stand having a base portion;
   (b) means providing an electric motor mounted on said stand and spaced apart from said base;
   (c) a shelf portion connected to said stand and interposed between said motor and said base portion of said stand, said shelf portion having first orifice means defining a first portion of an adjustable extrusion orifice, said first orifice means comprising alternating openings and intervening lands which are circumferentially arranged about a central axis;
   (d) a reservoir removably mounted on said shelf portion and extending between said shelf portion and said motor for containing a supply of the precursor mixture, said reservoir including a cylindrical compression chamber part disposed adjacent said shelf portion and a frusto conical mixing chamber part between said compression chamber part and said motor;
   (e) a movable shutter member interposed between said shelf and said reservoir, said shutter member including second orifice means defining a second portion of said adjustable extrusion orifice, said second orifice means comprising alternating openings and intervening lands which are circumferentially arranged about said central axis and which are movable into variable degrees of registry with first recited openings and lands to vary the size of said adjustable extrusion orifice; and
   (f) rotatable screw means operably connected to said motor for continuously re-mixing and emulsifying the precursor mixture to form cream therefrom, said screw means having a remixing and stirring portion having paddles disposed in and conforming generally to the shape of said frusto conical mixing chamber part of said reservoir, and said screw means having a helical compression portion disposed in and conforming generally to the shape of said cylindrical compression chamber part of said reservoir whereby said screw means is operable to continuously prevent the precursor mixture in the mixing chamber part of the reservoir from separating into its component parts, and said screw means is further operable to continuously emulsify said precursor into cream in said compression chamber part of the reservoir and continuously extrude the cream through said adjustable extrusion orifice.

2. The appliance of claim 1 further comprising means for heating the precursor mixture in the reservoir to a temperature in the range of about 105° F. to about 115° F.

3. The appliance of claim 2 wherein said means for heating includes a protrusion on said reservoir which engages stop means on said shelf portion to prevent rotational movement of said reservoir during operation of the appliance.

4. The appliance of claim 1 wherein said shutter member includes a central concave socket and said screw means includes a terminal ball part which removably seats in said shutter socket whereby said screw means is readily detachable from said shutter member for cleaning.

5. The appliance of claim 1 further comprising means for detenting shutter member in any of a number of preset rotational positions.

6. The appliance of claim 1 further comprising indicia means in said reservoir indicating a maximum fill level, said indicia means being positioned in said reservoir so that the distance between said indicia means and said extrusion orifice is less than the distance between said extrusion orifice and one of said remixing and stirring paddles whereby said one of said paddles projects above the precursor mixture when the reservoir is filled to said fill level.

7. The appliance of claim 1 wherein said shutter member includes a protruding manually operable handle for rotatably moving said shutter, and said shelf portion includes circumferentially opposed stops which limit clockwise and counter clockwise rotation of said shutter member between relatively open and relatively closed extremes.

* * * * *